(12) United States Patent
Buttin

(10) Patent No.: US 9,651,692 B2
(45) Date of Patent: May 16, 2017

(54) VIBRATOR TRUCK WITH A LIFT SYSTEM COMPRISING AT LEAST ONE FLEXIBLE STRAP

(71) Applicant: Sercel, Carquefou (FR)

(72) Inventor: Pascal Buttin, Clarac (FR)

(73) Assignee: Sercel, Carquefou (FR)

( * ) Notice: Subject to any disclaimer, the term of this patent is extended or adjusted under 35 U.S.C. 154(b) by 0 days.

(21) Appl. No.: 14/816,501

(22) Filed: Aug. 3, 2015

(65) Prior Publication Data

US 2016/0327664 A1 Nov. 10, 2016

Related U.S. Application Data

(60) Provisional application No. 62/158,927, filed on May 8, 2015.

(51) Int. Cl.
*G01V 1/09* (2006.01)
*G01V 1/143* (2006.01)
*G01V 1/145* (2006.01)
*G01V 1/02* (2006.01)

(52) U.S. Cl.
CPC .................................. *G01V 1/145* (2013.01)

(58) Field of Classification Search
CPC .......... G01V 1/143; G01V 1/147; G01V 1/09; G01V 1/155
USPC .......................... 181/114, 121, 113; 367/189
See application file for complete search history.

(56) References Cited

U.S. PATENT DOCUMENTS

| | | | | | |
|---|---|---|---|---|---|
| RE25,401 | E | * | 6/1963 | Clynch ..................... | G01V 1/09 181/114 |
| 3,205,971 | A | * | 9/1965 | Clynch ................... | G01V 1/053 181/114 |
| 3,291,249 | A | * | 12/1966 | Bays ......................... | G01V 1/09 181/114 |
| 3,860,087 | A | * | 1/1975 | Silverman .............. | G01V 1/155 181/114 |
| 4,108,270 | A | * | 8/1978 | Mifsud .................... | G01V 1/047 181/114 |
| 4,406,345 | A | * | 9/1983 | Fair ......................... | G01V 1/047 181/119 |
| 4,492,285 | A | * | 1/1985 | Fair ......................... | G01V 1/006 181/114 |
| 4,632,215 | A | * | 12/1986 | Farris ..................... | G01V 1/053 181/114 |
| 4,721,181 | A | * | 1/1988 | Airhart ................... | G01V 1/047 181/114 |
| 4,848,512 | A | * | 7/1989 | Airhart ................... | G01V 1/053 181/114 |
| 4,967,870 | A | * | 11/1990 | Airhart ................... | G01V 1/147 181/121 |
| 5,000,285 | A | * | 3/1991 | Airhart ................... | G01V 1/147 181/113 |
| 5,396,029 | A | * | 3/1995 | Talke ...................... | G01V 1/09 181/114 |

(Continued)

*Primary Examiner* — Edgardo San Martin
(74) *Attorney, Agent, or Firm* — Ipsilon USA, LLP

(57) ABSTRACT

A vibrator truck includes a vehicle and a vibration assembly mobile relative to each other by a lift system having at least one footbase and configured to lift up/down the vibration assembly. The lift system includes at least one flexible strap and a coupling device configured to couple the at least one flexible strap to the vibratory part and the at least one footbase.

19 Claims, 3 Drawing Sheets

(56) References Cited

U.S. PATENT DOCUMENTS

| | | | |
|---|---|---|---|
| 7,364,008 B2* | 4/2008 | Rau | G01V 1/143 |
| | | | 181/108 |
| 7,499,378 B2 | 3/2009 | Buttin et al. | |
| 8,061,471 B2* | 11/2011 | Wei | G01V 1/047 |
| | | | 181/119 |
| 8,893,848 B2* | 11/2014 | Eick | G01V 1/147 |
| | | | 181/101 |
| 8,913,465 B2* | 12/2014 | Wei | G01V 1/145 |
| | | | 367/189 |
| 2007/0205042 A1* | 9/2007 | Temple | G01V 1/147 |
| | | | 181/121 |
| 2012/0269040 A1* | 10/2012 | Wei | G01M 7/04 |
| | | | 367/189 |
| 2013/0228017 A1* | 9/2013 | Denney | G01M 7/04 |
| | | | 73/662 |
| 2013/0286789 A1* | 10/2013 | Eick | G01V 1/145 |
| | | | 367/189 |
| 2013/0286791 A1* | 10/2013 | Eick | G01V 1/09 |
| | | | 367/190 |

* cited by examiner

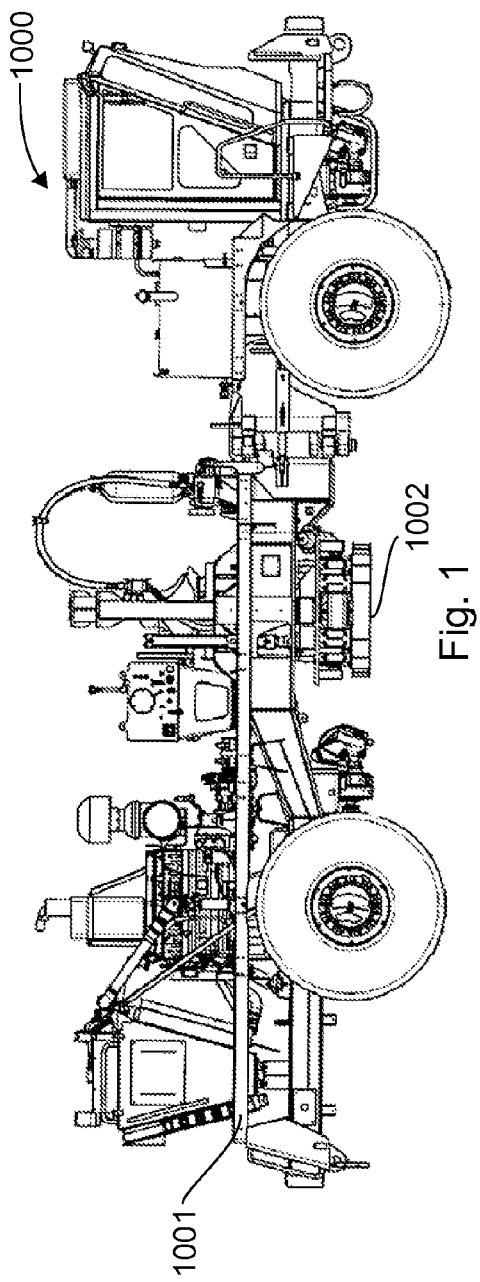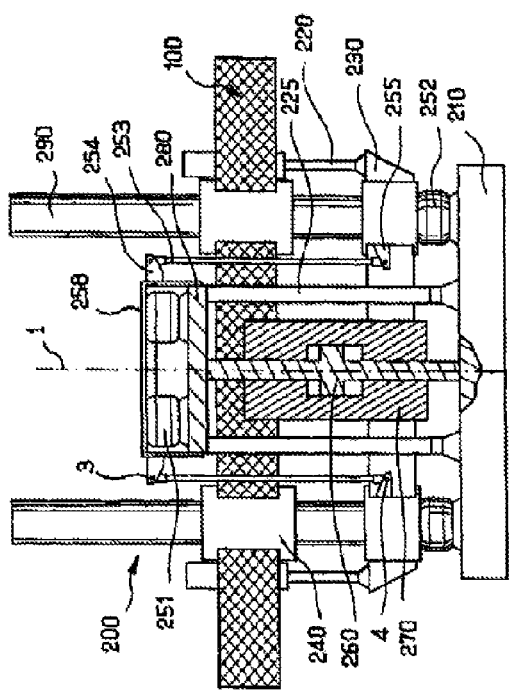

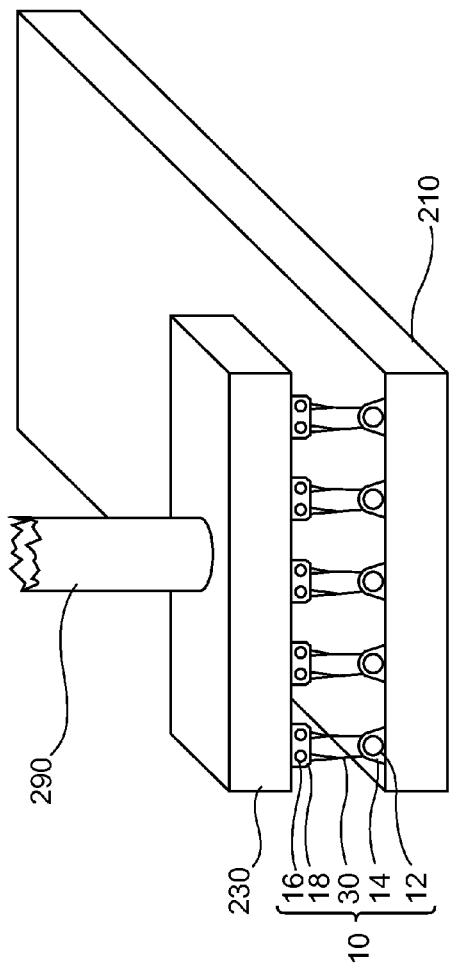
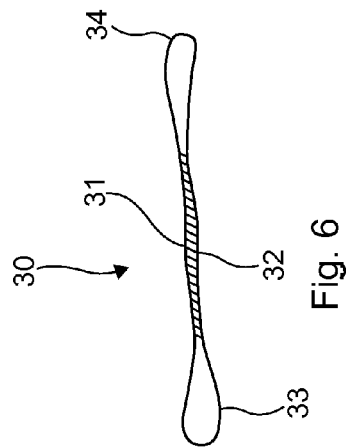
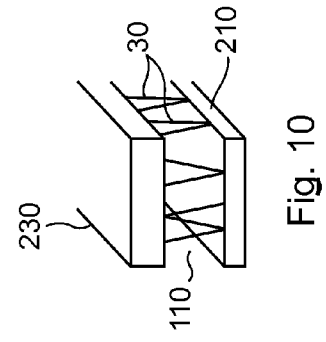
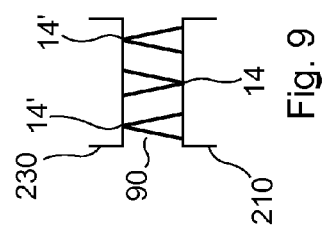
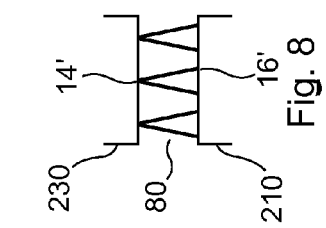

VIBRATOR TRUCK WITH A LIFT SYSTEM COMPRISING AT LEAST ONE FLEXIBLE STRAP

CROSS-REFERENCE TO RELATED APPLICATIONS

This Application claims priority from and the benefit of U.S. Provisional Application No. 62/158,927, filed May 8, 2015, the entire content of which is incorporated herein by reference.

FIELD OF THE DISCLOSURE

The field of the disclosure is that of acquiring geophysical and seismic data on the ground, in particular for the purpose of exploiting fields of hydrocarbons.

In order to collect geophysical data, one or more seismic sources in contact with the ground are activated to propagate series of omnidirectional seismic waves. The series of waves reflected by the strata of the subsurface are then detected by sensors which generate a signal characterizing the reflection of the waves on the geological interfaces of the subsurface.

More specifically, the disclosure relates to a vibrator truck configured as a seismic source.

TECHNOLOGICAL BACKGROUND

Traditionally, and as shown in FIG. 1, a vibrator truck 1000 comprises a vehicle (also referred to as "mobile platform") 1001 and a vibration assembly (also referred to as "shaker") 1002 which are mobile relative to each other by a lift system assembly (also referred to as "ground-hugging assembly").

The function of the vibration assembly is to apply, to the ground, a variable force (of the sinusoidal type for example) of predetermined nominal value. To this end, and referring to FIG. 2, the vibration assembly includes a vibrator part and a baseplate (also referred to as "support plate") 210 for coupling to the ground. The baseplate 210 is used to transmit the vibrations generated by the vibrator part through the ground. In the shown example, the vibrator part includes a reaction mass 270, a drive piston 260, an upper plate 280 and stilt legs 225. The stilt legs, located between the upper plate 280 and the baseplate 210, are intended to more evenly distribute the pressure applied by the weight of the mobile platform onto the baseplate 210. The drive piston 260 guides the reaction mass 270 in a relative movement with respect to the baseplate 210 when the servo valve is operated. The vibrator part is thus used to generate a seismic vibration wave and to transmit it into the ground.

The ground-hugging assembly is fixed to the vibration assembly, and mounted to slide on the chassis 100 of the vehicle 1001:

firstly to place the vibration assembly on the ground or raise it. In other words, the ground-hugging assembly behaves like a lift system configured to lift the vibration assembly up (for moving the vehicle between two vibration locations) or down (for placing it on the ground, at a vibration location); and secondly to transfer the weight of the mobile platform onto the baseplate 210 and the top plate 280, which thus applies a static pre-load in a direction along an axis 1, to increase the power of the vibration transmitted to the ground.

In the example shown in FIG. 2, the lift system includes guide bushings 240 mounted in the chassis 100 of the vehicle in which lift (guide) columns 290 can slide, at least one footbase (also referred to as "beam") 230 secured to the lower part of the guide columns 290 and more or less perpendicular to the lift (guide) columns 290, and lift cylinders 220 mounted between the chassis 100 and the footbase 230 to control the transfer of the weight of the vehicle on the vibration assembly.

More details concerning the known technique (described briefly above) can be found in U.S. Pat. No. 7,499,378, which is incorporated herein by reference. In particular, a description of elements 3, 4, 200, 251-255 and 258 is not given herein but can be found in the aforesaid US patent.

In the phase of lifting up or down the vibration assembly, i.e. when the vehicle weight is not transferred on the baseplate, the connection between the ground-hugging assembly (and more precisely the at least one footbase) and the vibration assembly is ensured by chains mounted in hose-like pieces of rubber, thus giving the vibration assembly a sufficient degree of movement to adapt to a ground which is rarely flat. In the up position and in the phase of lifting up or down the vibration assembly, the chains support the load of the vibration assembly and are therefore tensioned. In the down position, when at least a part of the vehicle weight is applied to the vibration assembly, the chains no longer support load and are therefore released (slackened).

The rubber hoses, or sheaths (sleeves), around the chains prevent links of the chains to knock against each other (i.e. prevent the clicking of the links) during vibration in the down position, and thereby avoid producing a noise resulting in pollution for the seismic acquisition (slackened chains down).

This known solution of chains with rubber hoses is reliable and adapted.

However, for vibrator trucks having a great peak force output (e.g. 60,000 lbf (i.e. 264 000 N) or more), there are sometimes breaks (failures) of the chain attachments, requiring replacement operations, or preventive maintenance. In both cases the implementation or withdrawal of chains is a complicated operation.

Sometimes, the forces applied to the chains distort the fixing nuts and it becomes even more difficult to replace the chains which might need new brackets to be welded.

Moreover the rubber hoses are not always completely effective and a noise resulting from the clicking of links is sometimes observed.

SUMMARY

A particular aspect of the present disclosure relates to a vibrator truck comprising a vehicle and a vibration assembly mobile relative to each other by a lift system comprising at least one footbase and configured to lift up/down the vibration assembly, wherein the lift system comprises at least one flexible strap and a coupling device configured to couple the at least one flexible strap to the vibratory part and the at least one footbase.

The general principle is that of replacing the sheathed chains (i.e. the chains mounted in hose-like pieces of rubber) by flexible straps adapted to carry the load.

This provides several advantages, including:

a more reliable solution (no breaking of anchorages and increased strength compared with the known solution);

the replacement operations and/or preventive maintenance are easier than with sheathed chains;

the aforesaid noise resulting from the clicking of links is suppressed.

According to a particular feature, the coupling device comprises the following components: a first fixing member, a second fixing member, and at least one winding axle, wherein each of said components is fastened to the at least one footbase or to the vibration assembly. Among said components, there is at least one pair comprising a fixing member and a winding axle which are fastened to two different elements among the at least one footbase and the vibration assembly.

According to a particular feature, the at least one flexible strap is coupled at each end to one of said first and second fixing members and winds along its length around said at least one winding axle.

According to a particular feature, the at least one flexible strap passes alternately from a component fastened to the at least one footbase to a component fastened to the vibration assembly.

LIST OF FIGURES

Other features and advantages of embodiments shall appear from the following description, given by way of indicative and non-exhaustive examples and from the appended drawings, of which:

FIG. 1, already described, shows a side view of a known vibrator truck;

FIG. 2, already described, shows a known implementation of a vibration assembly and a ground-hugging assembly;

FIG. 5 is a perspective view detailing the linking assembly of FIGS. 3 and 4;

FIG. 6 shows a preferred embodiment of a flexible strap comprised in the linking assembly of FIGS. 3 and 4; and FIG. 7 to 10 show alternative embodiments of the linking assembly.

DETAILED DESCRIPTION

In all of the figures of the present document, similar elements and steps are designated by the same numerical reference sign.

Figure 4:
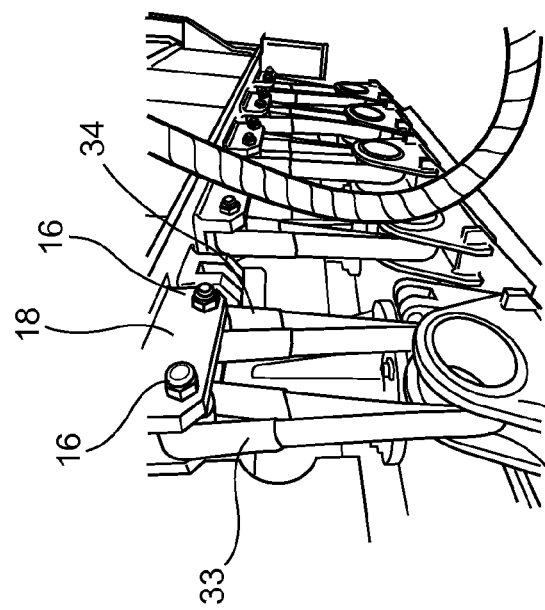
FIGS. 3 and 4 are a side view and a perspective view respectively, of a linking assembly, between the baseplate of the vibration assembly and the footbase (or one of the footbases) of the ground-hugging assembly, according to an illustrative embodiment of the disclosure.
Figure 3:
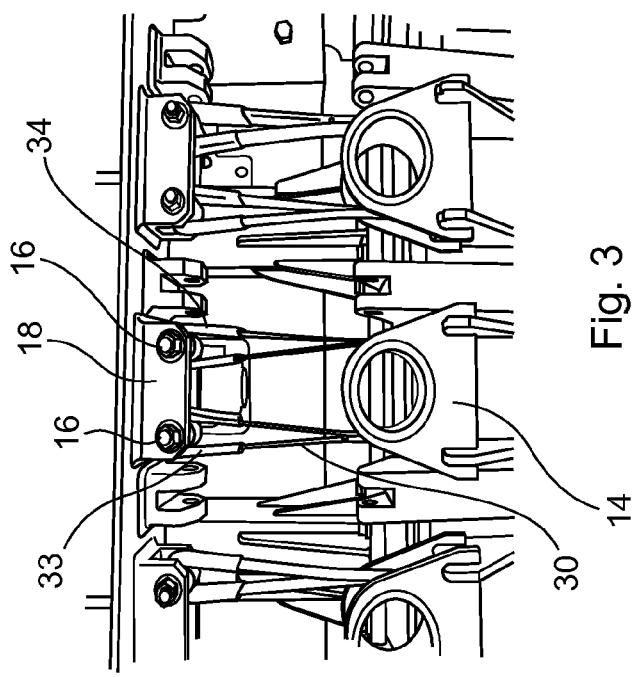

In the following description, considering again the context of FIG. 2, we describe with FIG. 3 to 5 a particular embodiment of a linking assembly 10 carrying out the connection between the baseplate 210 of the vibration assembly (comprising elements 210, 225, 260, 270 and 280) and the footbase 230 (or one of the footbases) of the ground-hugging assembly (comprising elements 220, 230, 240 and 290) which behaves like a lift system.

The linking assembly 10 comprises a plurality of flexible straps 30 (five in this embodiment) made with a mainly non-metallic material (polyester material preferentially).

Each strap 30 is associated with a coupling device for coupling this strap to the footbase 230 and the baseplate 210. For the coupling to the footbase 230, each coupling device comprises two fixing members embodied as two pins, or support axles, 16 fastened (e.g. with nuts) to a fixing bracket 18 which is itself fastened, in particular welded, to the footbase 230. A bushing can be mounted on the support axle 16 to increase the diameter of the loop. For the coupling to the baseplate 210, each coupling device comprises a winding axle 14, like a pin or a larger diameter tubing, fastened to the baseplate 210. The winding axles 14 of the plurality of coupling devices are fastened, e.g. welded, along one side of the baseplate 210.

Each strap 30 comprises at each end an attachment loop 33, 34 for passage of one of the support axles 16. The link with the baseplate 210 is carried out by a winding of the strap 30 along its length around the winding axle 14.

At least for a winding portion 12, which winds around the winding axle 14, the strap 30 is at least doubled in thickness, the two or more thicknesses being preferentially secured to one another. In particular, it is made as a looped band of flexible polymer, possibly with reinforcing non-metallic fibers.

If the ground-hugging assembly comprises several footbases (e.g. two, as in the case of Sercel's vibrator trucks of the "Nomad 65" type), each footbase is connected to the baseplate 210 of the vibration assembly, via a linking assembly 10 as described above (in particular five straps 30 associated with five coupling devices).

Each strap 30 has a suitable resistance to traction. In a preferred embodiment, these flat straps 30 of flexible material have the following characteristics:
polyester material;
working load limit (WLL): 1 t;
width: 30 mm;
utilization factor ⅐ EN1492-1 standard (WXLL/rupture);
five doubled straps on each opposite side of the baseplate 210: lift capacity=5×2×2×1000=20 000 kg.

In a particular embodiment shown in FIG. 6, each flexible strap 30 is formed in a closed main loop having: first and second portions 31, 32 secured to one another (forming two thicknesses secured to one another and winding around a winding axle 14); a third portion 33, extending from a first end of each of the first and second portions and forming a first attachment loop; and a fourth portion 34, extending from a second end of each of the first and second portions and forming a second attachment loop. In a particular embodiment, at least for the winding portion 12, the two thicknesses are glued or sewn to avoid friction.

To simplify maintenance in case of breakage/fracture, in particular of the strap, the two support axles 16 are fixed by bolting to the fixing bracket 18, dismounting of these two support axles 16 making it possible to replace the strap 30.

To limit the traction forces on the straps 30, the diameter of the winding axle 14 corresponds substantially to the spacing between two support axles 16. Thus, the recovery force is parallel to the greatest force, i.e. gravity.

To preserve the straps 30, the diameter of the support axles 16 guarantees sufficient radius of curvature of the straps.

In a particular embodiment, the vibrator truck has a peak force output equal to or greater than 60,000 lbf (i.e. 264 000 N).

In the alternative embodiment of FIG. 7 (linking assembly 70), a single strap 30' is associated with several coupling devices as described above. Each end of the single strap 30' has an attachment loop 33, 34 through which passes one of the support axles 16. In this example, one of the support axles 16 is fastened to the baseplate 210 and the other one is fastened to the footbase 230. The single strap 30' winds along its length around several winding axle 14 (four in this example), passing alternately from a winding axle 14 fastened to the footbase 230 to a winding axle 14 fastened to the baseplate 210.

In the alternative embodiment of FIG. 8, the linking assembly 80 differs from the linking assembly 10 of FIG. 5 in that, for each coupling device, the two fixing members are embodied as two support axles 16 fastened to a fixing bracket (not shown) which is itself fastened to the baseplate 210; and the winding axle 14' is fastened to the footbase 230.

In the alternative embodiment of FIG. 9 (linking assembly 90), for two adjacent coupling devices, one is implemented as in FIG. 5 and the other as in FIG. 8. In other words, the winding axles 14, 14' of two adjacent coupling devices are not fastened to the same element (one 14' is fastened to the footbase 230 and the other 14 to the baseplate 210).

In the alternative embodiment of FIG. 10 (linking assembly 110), the winding axles 14 of the plurality of coupling devices are fastened along two successive sides of the baseplate 210. In other alternative embodiments, the winding axles can be fastened along two opposite sides of the baseplate 210 or along more that two sides of the baseplate 210.

Although the present disclosure has been described with reference to one or more examples, workers skilled in the art will recognize that changes may be made in form and detail without departing from the scope of the disclosure and/or the appended claims.

The invention claimed is:

1. A vibrator truck comprising:
a vehicle;
a vibration assembly; and
a lift system by which the vehicle and vibration assembly are mobile relative to each other, the lift system comprising at least one footbase and configured to lift up/down the vibration assembly, and wherein the lift system comprises at least one flexible strap and a coupling device configured to couple the at least one flexible strap to the vibration assembly and the at least one footbase, wherein the coupling device comprises the following components: a first fixing member, a second fixing member, and at least one winding axle, wherein each of said components is fastened to the at least one footbase or to the vibration assembly, and wherein, among said components, there is at least one pair comprising a fixing member and a winding axle which are fastened to two different elements among the at least one footbase and the vibration assembly.

2. The vibrator truck according to claim 1, wherein the at least one flexible strap is coupled at each end to one of said first and second fixing members and winds along its length around said at least one winding axle.

3. The vibrator truck according to claim 2, wherein the at least one flexible strap passes alternately from a component fastened to the at least one footbase to a component fastened to the vibration assembly.

4. The vibrator truck according to claim 1, wherein the first and second fixing members are fastened to the at least one footbase.

5. The vibrator truck according to claim 1, wherein the coupling device comprises at least two winding axles and wherein the at least one flexible strap passes alternately from a winding axle fastened to the at least one footbase to a winding axle fastened to the vibration assembly.

6. The vibrator truck according to claim 1, wherein the lift system comprises a plurality of flexible straps and a coupling device for each of said flexible straps.

7. The vibrator truck according to claim 6, wherein the coupling devices are similar.

8. The vibrator truck according to claim 1, wherein the components of the at least one coupling device fastened to the vibration assembly are fastened along two sides of a baseplate comprised in the vibration assembly.

9. The vibrator truck according to claim 1, wherein the at least one flexible strap comprises at each end an attachment loop, the coupling device comprising two support axles which pass through said attachment loops.

10. The vibrator truck according to claim 2, wherein the at least one flexible strap comprises, at least for a portion which winds around the at least one winding axle, at least two thicknesses secured to one another.

11. The vibrator truck according to claim 10, wherein the at least one flexible strap is formed in a closed main loop having: first and second portions secured to one another, forming two thicknesses secured to one another and winding around the at least one winding axle; a third portion and a fourth portions, extending from both ends of said first and second portions and forming two attachment loops, wherein a support axle comprised in said first and second fixing member passes through each of said attachment loops.

12. The vibrator truck according to claim 11, wherein the two support axles comprised in the coupling device are fastened to one among the footbase and the vibration assembly, the coupling device comprising only one winding axle fastened to the other among the footbase and the vibration assembly, wherein the diameter of the winding axle substantially corresponds to the distance between the two support axles of the first and second fixing members.

13. The vibrator truck according to claim 1, having a peak force output greater than or equal to 60 000 lbf.

14. A vibrator truck comprising:
a vehicle,
a vibration assembly; and
a lift system configured to lift up/down the vibration assembly relatively to the vehicle, wherein the lift system comprises at least one footbase and a plurality of coupling assemblies, each coupling assembly comprising: a flexible strap, a winding axle fastened to one among the at least one footbase and the vibration assembly, a first fixing member and a second fixing member, each fixing member being fastened to the other among the at least one footbase and the vibration assembly than the winding axle.

15. The vibrator truck according to claim 14, wherein each coupling assembly comprises only one winding axle, the winding axles of the coupling assemblies being fastened to the same element among the at least one footbase and the vibration assembly.

16. The vibrator truck according to claim 14, wherein the flexible straps are closed bands with a middle portion wherein the two band thicknesses are secured to one another and two extremity portions wherein the band forms an open attachment loop, the attachment loops passing around a support axle of said first and second fixing members and the middle portion winding around the winding axle.

17. A vibrator truck comprising:
a vehicle,
a vibration assembly with a baseplate; and
a lift system configured to lift up/down the baseplate relative to the vehicle, wherein the lift system comprises a footbase and at least one coupling assembly, each coupling assembly comprising two support axles fastened to said footbase, a winding axle fastened to said baseplate, and a strap with an attachment loop at each end, said attachment loops surrounding said support axles and the strap winding around said winding axle.

18. The vibrator truck according to claim 17 wherein the baseplate is a parallelepiped and comprising a plurality of coupling assemblies, wherein at least two coupling assemblies have their winding axle fastened on two different sides of said baseplate.

19. The vibrator truck according to claim 17 wherein the diameter of the winding axle of a coupling assembly substantially corresponds to the distance between the two support axles of said coupling assembly and the vibratory truck has a peak force output greater than or equal to 60 000 lbf.

* * * * *